Jan. 13, 1959 A. R. DAVIS Re. 24,586

ELECTRIC SWITCHBOARDS

Original Filed Nov. 16, 1954 2 Sheets-Sheet 1

INVENTOR.
ARIEL R. DAVIS
BY
Frank A. Bower
ATTORNEY

ELECTRIC SWITCHBOARDS

Original Filed Nov. 16, 1954 2 Sheets-Sheet 2

INVENTOR.
ARIEL R. DAVIS
BY
Frank C. Bower
ATTORNEY

United States Patent Office

Re. 24,586
Reissued Jan. 13, 1959

24,586

ELECTRIC SWITCHBOARDS

Ariel R. Davis, Salt Lake City, Utah

Original No. 2,796,473, dated June 18, 1957, Serial No. 469,201, November 16, 1954. Application for reissue August 11, 1958, Serial No. 755,836

6 Claims. (Cl. 200—16)

Matter enclosed in heavy brackets [ ] appears in the original patent but forms no part of this reissue specification; matter printed in italics indicates the additions made by reissue.

This invention relates to lighting control and particularly to electric switchboards for providing a selection of current and voltage sources having different values for lights of a theatre or the like.

It is often desirable in the operation of banks of lights to change from one level of intensity to another depending on the illumination required at that time.

This is particularly true in the case of theatre lights where the illumination requirements may be changed from scene to scene or within a scene. The lights should be accurately and precisely set at the desired level of intensity. A group of dimmers may be present and the lights shifted from one dimmer to another. It is further desirable that each set of lights be connected to any one of the dimmers thereby reducing the amount of wire required to connect the lights to a power source and the number of dimmers required and providing flexibility of operation. Another desirable feature is to reduce the space occupied by the switchboard and housing.

An object of the invention is to provide an electric switchboard for connecting lights to any one of a number of sources of electricity having different voltages.

An object of the invention is to provide an electric switchboard which transfers the lights from one setting to another without contacting any intermediate sources.

Another object of the invention is to connect different sets of lights to the same dimmer to load the dimmer to full capacity.

Another object of the invention is to provide a small compact switchboard that has a minimum of connecting wires and occupies a small space.

A further object of the invention is to provide an electric switchboard that is inexpensive to manufacture and install.

Other and further objects and advantages will become apparent from the following specification taken in connection with the accompanying drawings, in which—

Figure 6:
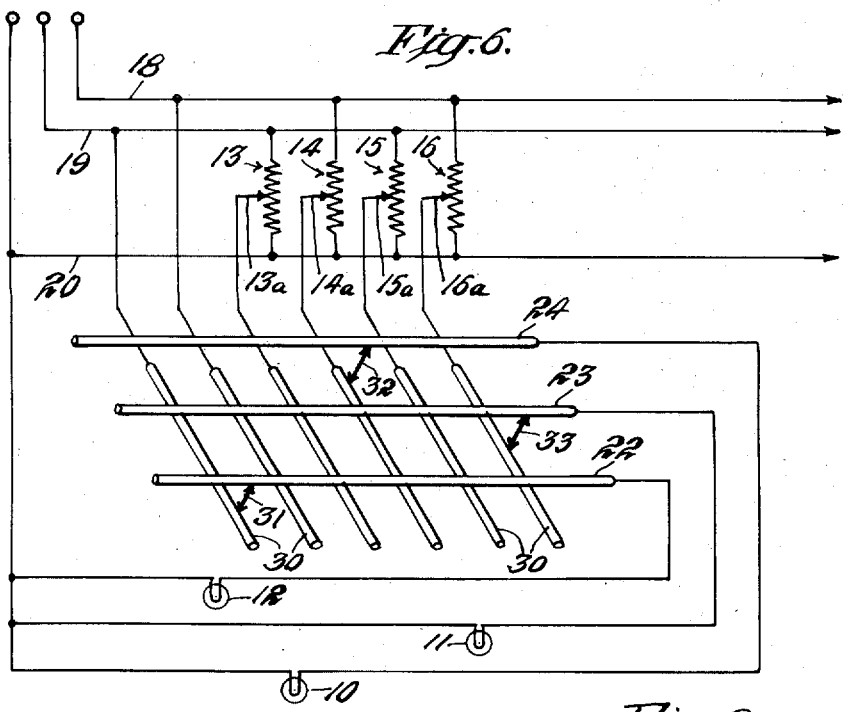
Fig. 6 is a schematic circuit diagram showing the connections to loads and to the current adjusting means.

Referring to Fig. 6, there is schematically shown an electric switchboard 17 for connecting the lights 10, 11, 12, such as theatre lights, to dimmers 13, 14, 15, 16. The dimmers are connected between power lines 18 and 20 or 19 and 20 and the lights are between the rails 22, 23, 24 of the electric switchboard 17 and the power line 20. The electric circuit is completed through the adjustable contacts 25, 26, 27, 28 of the dimmers 13, 14, 15, 16 which are each connected to a separate conducting bar 30 of the electric switchboard through the adjustable taps 13a, 14a, 15a, 16a. The lights through the rails 22, 23, 24 are singly connected to the bars 30 by the contacts 31, 32, 33 in sliding contact with the rails and point contact with the bars 30. Thus, each load may be connected to any one of the dimmers but not more than one dimmer at one time. The lights 10, 11, 12 may be connected to the same bar and the same dimmer at the same time. This provides flexibility of selection of the intensity of illumination of the lights. The taps determine the voltage across the light when one of the sliding contacts engages the bar connected to the tap. The taps are set at different positions to tap different voltages from respective dimmers. As the contacts engage the bars, the different voltages are at different values and are placed across the lights. Thus, before the performance of a play, the taps are pre-set and during the play a contact may be moved from one bar to another and correspondingly change the intensity of illumination.

The lines 18, 19 are connected directly to a respective bar 30 so that the lights 10, 11, 12 may have a full line voltage applied to them.

Considering the electric switchboard in detail, the electrically conducting bars 30 are fitted in evenly spaced and parallel slots 36 to cut in the raised longitudinal central portion 37 of the base 38. The base is made of a stiff, hard electrically insulating material.

The slots extend across the width of the central portion. On each side of the central portion 37 are cut portions 39 and 40 for the cable terminals 42, 43 connected to the bars 30. The slots are cut deep into the central portion to form walls 44, 45 and concave portions 46, 47 are drilled in the bottom of the slots and are a greater distance apart than the walls 44, 45 to hold the bars. The bars 30 are inserted endwise between the concave walls. The bars are recessed in the slot and the walls 44, 45 have a substantial depth to form an air space or chamber 48 which quenches any spark tending to form on breaking of contact with the bar 30. The bars have eyelets or fastening portions 49 which are positioned in the cut portions 39, 40 and bolted to the base 38 by the terminals 42, 43. The terminals of successive bars are alternately positioned on opposite sides of the central portion 37 in the cut portions 39, 40, respectively, permitting a close arrangement of the bars and providing space around the terminals 42 or 43. Between the slots are strips 85 spacing the bars 30. The slots 36, strips 85 and bars 30 are parallel and evenly spaced in the intermediate portion of the central portion 37 between mounting portions 51 and 52 on opposite ends of the central portion 37. The mounting portions 51, 52 provide space for securing the upper contact holder 53 to the base 38. The contact holder 53 comprises vertically positioned and evenly spaced guides 54 centered longitudinally on the central portion 37 and fitting into evenly spaced grooves in the top 55 which is secured to the base 38 by bolts 56 threaded in the openings 57 in the mounting portions 51, 52. In cooperation with the grooves in the top 55 the guides 54 are uniformly spaced by spaces 57 fitting in between the guides 54 and held by the bolt 58 and the nut 59 at one end of the contact holder 53 and, similarly, by spaces 61 and similarly fastened by a bolt 62 and a nut (not shown) at the other end. The contacts 31, 32, 33 slide in the parallel slots 63, 64, 65 extending longitudinally in the supporting member 55 to permit the contacts to move transversely to the slots and bars. The rails 22, 23, 24 are preferably made of wire and have two legs on opposite sides of the respective slots 63, 64, 65 and parallel thereto. The rails are held tightly against the top 55 by the spaces 57 and 61. The two long legs on each side of an associated slot provide two longitudinal contacting surfaces extending the length of the switchboard. At one end each rail is bent over the respective spacer and secured by a terminal bolt 66 to which the leads to the respective lights are secured. The guides 54 extend longitudinally beyond the spacer to form recesses 66 to isolate the terminals.

The contacts 31, 32, 33 are identical in construction and operate in the same manner, and identical parts of respective contacts operating in the same way are numbered for simplicity of description. Each contact comprises a blade 70 preferably made of a silver alloy fitting into a slot and silver-soldered to a blade holder 71 having an inner cylindrical bore extending substantially half the length of the holder from the end opposite to the blade 70. The contacts are shown in Figs. 3, 4, 5 and 8. The slots 72 are formed on opposite sides of the holder and extend the length of the bore and merge with a transverse slot across the holder. A tubular member 73 with a square head 74 on one end thereof telescopically fits into the bore and a helical spring 80 fits inside of the tubular member and seats on the bottom of the bore in the holder to force said members apart (Fig. 4). A flat contact plate 74a made of silver is soldered to the head 74 and engages the two surfaces of the rail. The blade 70 fits into the slots in the base 38 to engage the bars 30. A braided wire 76 is fitted in a slot 75 in the holder 71 adjacent the blade 70 and has the free ends fitting into a slot 77 in the head 74 adjacent the contact surface 74a. The braided wire is formed in two flexible leads to yield with the movement between the tubular member and the holder.

Figure 1:
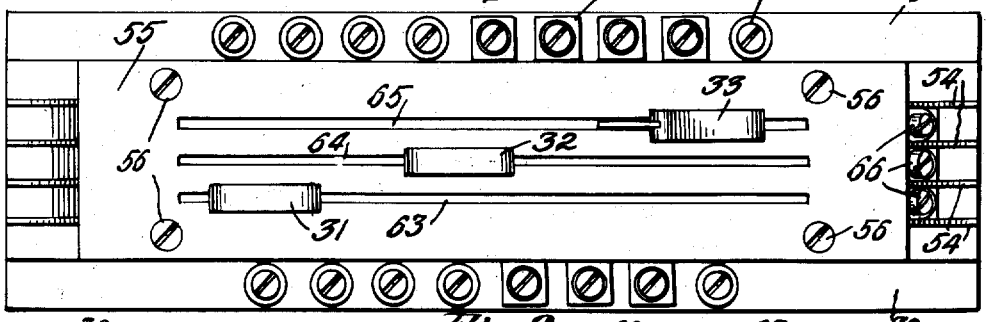
Fig. 1 is a top view of the switchboard.
Figure 2:
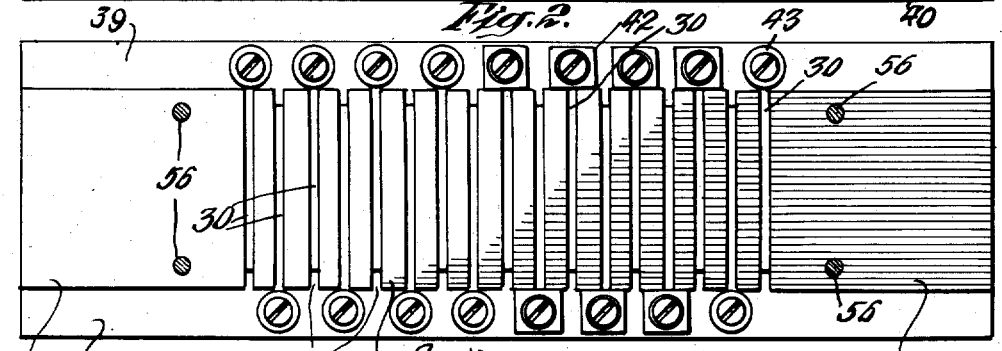
Fig. 2 is a top view of the base along lines 2—2 of Fig. 3 with slots and conducting bars.
Figure 3:
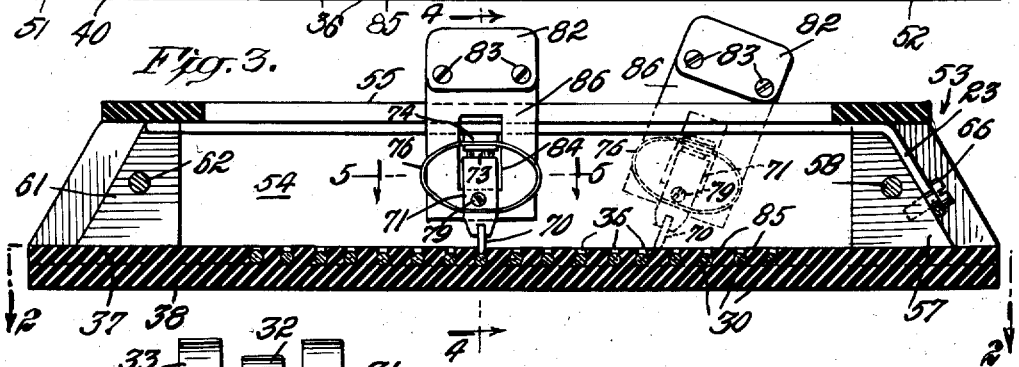
Fig. 3 is a sectional view along lines 3—3 of Fig. 1.
Figure 4:
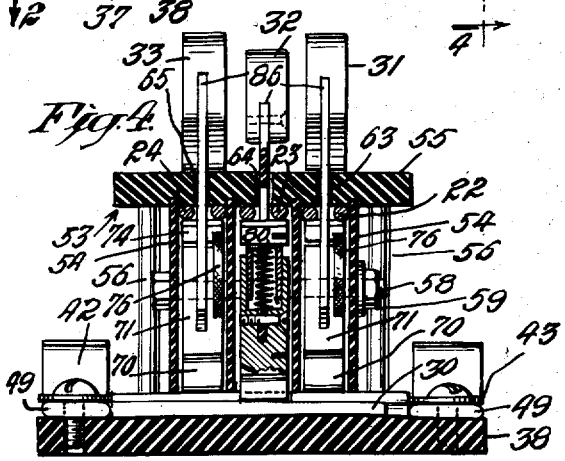
Fig. 4 is a sectional view along lines 4—4 of Fig. 3.
Figure 5:
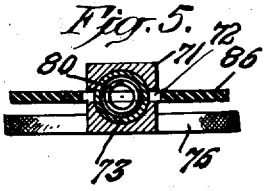
Fig. 5 is a sectional view along lines 5—5 of Fig. 3.

In Figs. 3 and 4, the holder 71 and the tubular member 73 are preferably made of a highly electrically conductive material hard enough to withstand physical usage, such as brass. The tip 71a and the head 74 electrically connect the braided wire to the blade 70 and contact plate 74a. The blade holder is mounted on a sheet 86 of thin, stiff insulating material having a rectangular shape fitting in the opposing slots 72 and seating in the transverse slot in the blade holder 71, and a bolt 79 extends through the transverse slot and is threaded in the blade holder 71 fastening the sheet 86 thereto. The insulating sheet extends through the slot 63 in the top and has a grip 82 of insulating material fastened by bolts 83 to the exposed end for moving the contact. The sheet has an elongated vertical opening 84 extending from the bottom of the bore of the blade holder 71 to above the rails through which the tubular member 73 moves as the blade 70 is moved in and out of the slots 36 or as the contact 33 is pivoted about the end of the blade.

Figure 7:
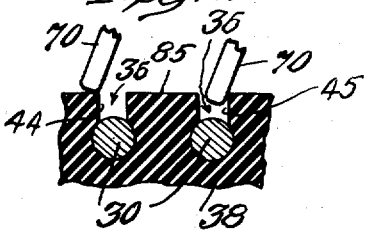
Fig. 7 is a sequential view of the movement of a contact along the base.
Figure 9:
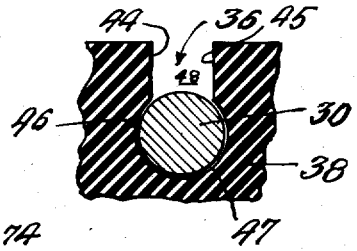
Fig. 9 is a fragmentary sectional view of the terminal bar in the groove or slot in the base.
Figure 8:
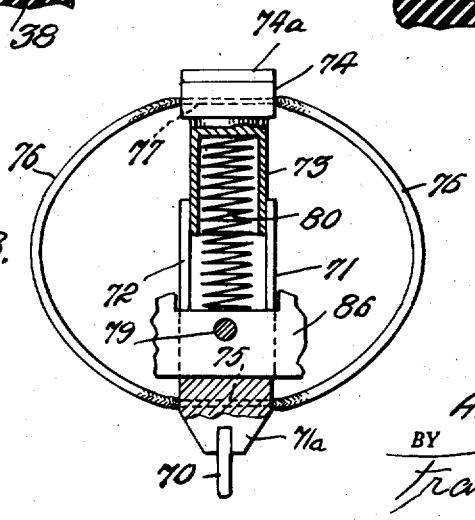
Fig. 8 is a fragmentary exploded view of the contact.

As shown in Fig. 4, the helical spring 80 is housed in the bores of the holder 71 and tubular member 73 and seats in the bottom of the bores. The spring is under compression when the contact is in position, creating a pressure to maintain the contact surface 76 in contact with the rails and force the blade 70 firmly against the bar 30 when set vertically in the slot 36. The spacers 57 and 61 and the grooves in the top have a width to space the guides 54 slightly greater than the widths of the blade holder 71 and blade 70, and the groove 63 has a width slightly greater than the thickness of the sheet 81 to hold the blade 70 parallel to the slots 36 and provide for easy sliding of the contact. The contact moves between the guides 54 without twisting or turning so that when the blade 70 is stopped at a slot 36 the blade will fit into the slot and engage the bar. The insulating strip 85 between the bars 36 spaces the bars and provides a surface along which the blade 70 slides when the position of the contact is changed. With the grip 83 spaced a distance A from the surface of the top 55, the contact freely pivots about the contacting edge of the blade 70 when it is either in the slot or resting on the strip 85. The length of the blade holder 71 and the tubular member 73 in fully compressed position is less than the distance of the contact surfaces of the rail from the strip 85. In Fig. 4 the contact 33 is shown in a vertical position, and the flat surface contact 74a sets against the rails with the blade on a strip 85. As shown in Fig. 3 the contact may be tilted towards either end of the switchboard depending on the direction of movement. The degree of tilt is limited by the rounded ends of the grip 83 which engage the upper surface of the supporting member 55. The contact plate 74a is unseated and turned to engage the rails along a lateral edge. The lateral edges are rounded to present a smooth surface to the rails. The slots 36 are sufficiently deep so that the blade 70 does not engage the bars 30 as the contact is moved longitudinally. As the blade 70 is drawn across a strip 85, it drops off the edge of the wall 44 and pivots or swings about the rounded contact edge of the grip 83 and hits against the opposing edge of the wall 45 of the succeeding switch as illustrated in Fig. 7. The moving pressure holds the blade against the edge of the wall 45 and does not permit the blade 70 to drop down inside the slot and engage a bar 30. Thus, as the contact is moved along the strips 85 the contact surges across the slots 36 and does not engage the bars 30. When the desired bar is reached the pressure is released and the contact moves back slightly and the blade drops into the slot. The blade 70 engages a bar and the current passes to lights 10, 11, 12. On breaking contact with the bar 30 the contact 22 is pivoted about the rounded end of the blade 70 until the rounded edge of the grip 83 engages the top. The contact is further pressed and pivoted, sliding the blade along the other edge 44 or 45 depending on direction of movement and drawing it on to the strip 84. The blade holder 71 and blade 70 may be drawn vertically telescoping the tubular member 73 and blade holder 71 by pulling up on the grip 83. The blade is raised clear of the strips 85 and the contact is moved to the next position and dropped in the desired slot. The slots are deep so that a spark occurring on the separation of the blade 70 and bar 30 will be extinguished. The primary current path is through the bar 30, blade 70 to the lower end of holder 71 and thence through the braided wire loops to the block 74 and contact surface 76 which engages the rails 22.

In the drawing, three contacts are shown and described. The central portion 37 may be made wider and the bars 30 lengthened so that any number of contacts may be arranged parallel to one another thereby increasing the number of light loads that may be connected to the dimmers and likewise the central portion may also be lengthened to increase the number of bars and therefore the number of dimmers connected to the switchboard. The parallel arrangement of the bars and the parallel arrangement of the rails lateral to the bars permit a wide combination of lights and dimmers with a minimum of interconnecting wires.

The contacts are light in construction and held between the base and the supporting member. The rails are preferably made of wire and are held against the top 55, and the bars 30 are also preferably made of wire cut in the appropriate lengths and formed with an eye at one end. Thus, a minimum of metal is required. The metallic conducting portion formed by the blade 70, the blade holder 71 and the tubular member 73 is between the rail 22 and bar 30. The grip 83 and insulating sheet which move the contact are made of a light and stiff insulating material. The blades 70 are wide to provide a long contact surface on the bar 30 to provide an efficient transfer of electricity.

It is thus seen that the lights may be transferred from one dimmer to another without exposing operating personnel to any members carrying voltages. The changes may be made rapidly and accurately without engaging any intermediate bars. Another advantage from the arrangement of parts is that the switchboard is compact with a maximum number of lighting loads connectable to a maximum number of dimmers with a minimum of interconnecting parts and wires. A minimum amount of metallic parts is required and the structural members may be readily made from molded insulating material. The conducting bars 30 and the rails 22, 23, 24 may be considered to be conductive terminal means for passage of the current to the contact or contact assembly. The slots 36 may be considered to be grooves formed by the sides of the strips 85. Other loads in the lights 10, 11, 12 may be connected to the switchboard and the voltages thereto controlled by the adjustment of the contacts 31, 32, 33. It is not intended to limit the invention to the control of lights although this is the preferred use of the applicant's invention. The dimmers providing the voltages through the bars 30 may be conventional rheostats or auto-transformer type voltage devices.

One modification is that the telescoping relation of the tubular member and blade holder would be reversed. The tubular member 73 could be the outer member and the blade holder 71 could be the inner member.

Various other modifications and changes may be made in the embodiment as described without departing from the invention as set forth in the appended claims.

I claim:

1. A terminal in an insulating base comprising an elongated groove in said base and having two generally parallel opposing walls on opposite sides of said groove and extending inwardly from the outer portion of said groove and having concave opposing walls extending further inwardly from the inner edge of said parallel walls, a generally cylindrical shaped electrically conductive means *having* a diameter greater than the distance between said parallel walls and less than the diametric distance between said concave walls, said means inserted endwise between said concave walls and held therein recessed from the outer edges of the parallel walls to isolate the said means from transient movement of a contacting blade lateral to the parallel walls and provide a spark quenching chamber above said conductive means.

2. An electric switchboard comprising a base having grooves and flat lateral strips spacing said grooves and having opposing edges, said grooves having two opposing walls on opposite sides of each groove extending inwardly from said opposing edges, electrical conductive means at the bottom of said grooves, a contact blade having spring means urging said blade into a groove on engagement therewith and movable at an angle to said base across said [strip] *strips* and grooves with the blade dropping off the edge of a strip and the side of the blade contacting at an angle the opposing edge of the adjacent strip so that the contact blade is held from engaging said electrical conductive means.

3. An electric switchboard comprising a base having an intermediate portion with lateral grooves spaced by flat lateral strips and having mounting portions at each end, parallel sheet-like guides normal to said strips and extending longitudinally along said base transverse to said grooves, spacers of uniform thickness between said guides, a supporting member above said guides having longitudinal grooves fitting on the ends of said guides to cooperate with said spacers to evenly space said guides to form a channel, rail means extending longitudinally along said channel and mounted on said supporting member between said guides, electrically conductive bars recessed in said grooves to form chambers above said bars and a contact assembly mounted between and laterally supported by said guides to move through said channel for selectively connecting said bars to said rail and to pivot on said bar to tilt said contact in order to clear said bars on longitudinal movement.

4. An electrical switchboard comprising a base having conductive bars recessed below the surface of the base to form chambers between the surface and said bars, a supporting member having longitudinally extending guide means, a contact assembly supported by said guide means to move laterally to said conductive bars, a contact assembly having a contact portion positionable in said chambers to individually contact said conductive bars, said contact assembly laterally supported by said guide means to move laterally to said bars and pivotally on said base, to tilt said assembly between said guides at an angle so that on lateral movement of the assembly the contact portion projects into the groove a distance less than the depth of the chamber to remain out of contact with said conductive means.

5. An electric switchboard as set forth in claim 2 wherein said contact portion comprises a rectangular blade-shaped member having a width less than the space between the walls of said chamber to permit said blade-shaped member to be tilted in said chamber to engage one of said edges and pivot said blade on lateral movement to disengage said blade from said conductive means.

*6. An electrical switchboard comprising a base having lateral grooves and lateral strips spacing said grooves, said strips having laterally extending surfaces between said grooves and extending transverse thereto to provide a bearing surface for a blade, each of said grooves having opposing walls on opposite sides of said grooves and forming with the said strip surfaces opposing edges and extending inwardly from said strip surfaces and edges to form a groove portion recessed from said edges, electrical conductive means positioned in said recessed grooved portion with a top contact surface of said conductive means positioned inwardly within said groove to provide a space above said electrical conductive surface to receive the end of a conductive contacting blade, a contactor carrying a movable conductive contact blade adapted to enter said grooves to permit tilting of said blade in said groove and having spring means for urging said blade into said groove and into engagement with said top conductive contact surface, longitudinal guide means for movably supporting said contactor to move and tilt relative to said base and move said blade at an angle to said base across said strips and grooves for the rapid changing of position of the contactor, said contact blade at an angle moving across the surface of a strip and dropping off the strip to enter the space at an angle and contacting at an angle the opposing wall, said blade when held in the tilted position projecting less than the depth of said space into said groove by said force to permit rapid movement across a plurality of grooves from one position to another without engagement of intermediate electrical conductive means.*

References Cited in the file of this patent or the original patent

UNITED STATES PATENTS

| | | |
|---|---|---|
| 1,158,083 | Stout | Oct. 26, 1915 |
| 1,764,411 | Masek | June 17, 1930 |
| 1,975,564 | Tritle et al. | Oct. 2, 1934 |
| 2,487,199 | Titcomb | Nov. 8, 1949 |
| 2,612,557 | Turner | Sept. 30, 1952 |